(12) United States Patent
Stelmack

(10) Patent No.: US 9,497,392 B2
(45) Date of Patent: Nov. 15, 2016

(54) METHOD OF TRANSPORTING AND RECORDING IMAGERY OF A PLURALITY OF SIMILAR OBJECTS TO NEAR SPACE

(71) Applicant: Dennis Jason Stelmack, Fort Saskatchewan (CA)

(72) Inventor: Dennis Jason Stelmack, Fort Saskatchewan (CA)

( * ) Notice: Subject to any disclaimer, the term of this patent is extended or adjusted under 35 U.S.C. 154(b) by 269 days.

(21) Appl. No.: 14/218,794

(22) Filed: Mar. 18, 2014

(65) Prior Publication Data

US 2015/0271419 A1 Sep. 24, 2015

(51) Int. Cl.
*H04N 5/28* (2006.01)
*H04N 5/225* (2006.01)

(52) U.S. Cl.
CPC ............... *H04N 5/28* (2013.01); *H04N 5/225* (2013.01)

(58) Field of Classification Search
CPC ............................. H04N 5/225; H04N 5/28
USPC .......................................................... 348/82
See application file for complete search history.

(56) References Cited

U.S. PATENT DOCUMENTS

| | | | |
|---|---|---|---|
| 144,436 | A | 11/1873 | Browne |
| 496,177 | A | 4/1893 | Wilson |
| 603,182 | A | 4/1898 | French |
| 854,461 | A | 5/1907 | Burnell |
| 1,341,248 | A | 5/1920 | Upson |
| 2,931,597 | A | 4/1960 | Moore, Jr. |
| 4,681,138 | A | 7/1987 | Giuliani |
| 4,837,955 | A | 6/1989 | Grabhorn |
| 6,116,538 | A | 9/2000 | Hafelfinger |
| 2001/0018810 | A1 | 9/2001 | Chafer |
| 2001/0020296 | A1* | 9/2001 | Chafer ................ G06Q 40/02 725/1 |
| 2006/0000945 | A1 | 1/2006 | Voss |
| 2009/0103909 | A1* | 4/2009 | Giegerich ............. F16M 11/18 396/12 |
| 2009/0115636 | A1* | 5/2009 | Shibata ................ B64C 39/024 340/971 |
| 2009/0224094 | A1 | 9/2009 | Lachenmeier |
| 2012/0234965 | A1 | 9/2012 | Heppe |
| 2013/0037650 | A1 | 2/2013 | Heppe |
| 2014/0149244 | A1* | 5/2014 | Abhyanker .......... G06Q 10/087 705/26.2 |
| 2015/0151851 | A1* | 6/2015 | Lin ....................... B64D 47/08 348/144 |

FOREIGN PATENT DOCUMENTS

| | | |
|---|---|---|
| CA | 1065828 | 11/1979 |
| CA | 2085340 | 12/1991 |
| CA | 2215135 C | 2/1998 |
| CA | 2600963 A1 | 9/2006 |

OTHER PUBLICATIONS http://www.outdoorescapade.com/articles/projectloabn.php#.UvkZ8q-YbIV.

* cited by examiner

*Primary Examiner* — Behrooz Senfi

(57) ABSTRACT

A method of transporting a plurality of similar objects is disclosed herein. The method includes the step of positioning a first one of a plurality of similar objects in the field of view of a camera. The method also includes the step of disposing the remainder of the plurality of similar objects in a container outside of the field of view of the camera. The method also includes the step of transporting all of the plurality of similar objects and the camera and the container to the upper atmosphere. The method also includes the step of generating a video recording and capturing still images of the first one of the plurality of similar objects during at least a portion of the transporting step. The method also includes the steps of selling the objects, videos and the images after the retrieval of container.

10 Claims, 5 Drawing Sheets

METHOD OF TRANSPORTING AND RECORDING IMAGERY OF A PLURALITY OF SIMILAR OBJECTS TO NEAR SPACE

BACKGROUND OF THE INVENTION

1. Field of the Invention

The invention relates to a method of transporting a plurality of similar objects to near space, while capturing video and still images.

2. Description of Related Prior Art

U.S. Pat. No. 496,177 discloses an ADVERTISING BALLOON. The invention disclosed in the '177 patent is designed to provide a balloon for advertising purposes, and the invention consists in the peculiar construction, arrangement and combinations of parts therein after more particularly described and then definitely claimed. The invention is enabled to produce a very superior advertising means which from its novelty will attract great attention, and especially when the automatically discharged fire-works are employed. The balloon is of course to be provided with the usual rope by which its height above the houses can be regulated, and by which it can be drawn down when desired. Small transparencies may be arranged so that letters will appear one under the other instead of in horizontal lines.

SUMMARY OF THE INVENTION

In summary, the invention is a method of transporting a plurality of similar objects. The method includes the step of positioning a first one of a plurality of similar objects in the field of view of a camera. The method also includes the step of disposing the remainder of the plurality of similar objects in a container outside of the field of view of the camera. The method also includes the step of transporting all of the plurality of similar objects and the camera and the container to the upper atmosphere, also referred to as near space. The method also includes the step of generating a video recording and capturing still images of the first one of the plurality of similar objects during at least a portion of the transporting step.

BRIEF DESCRIPTION OF THE DRAWINGS

The detailed description set forth below references the following drawings.

DETAILED DESCRIPTION OF AN EXEMPLARY EMBODIMENT

The early era of space exploration was driven by a "Space Race" between the Soviet Union and the United States, the launch of the first man-made object to orbit the Earth, the USSR's Sputnik 1, on Oct. 4, 1957. The first human spaceflight took place on Apr. 12, 1961 when cosmonaut Yuri Gagarin made one orbit around Earth aboard the Vostok 1 and the first Moon landing by the American Apollo 11 craft on July 20, 1969. Armstrong said it best when he stepped onto the lunar surface and described the event as "one small step for man, one giant leap for mankind"

The invention, as demonstrated by the exemplary embodiment described below, can allow companies to use balloons to take objects or products to space with the end goal of advertising and marketing their product. The broader invention also encompasses methods sending collectables, trinkets, and products to near space via a balloon for profit or re-sale. "Near space" can be the upper troposphere, the stratosphere, the mesosphere, or the thermosphere. Embodiments of the invention can create a new market for products to be made available to space lovers and collectors.

The flight of the products can be used either to advertise or promote an idea or product. The product is reclaimed after the flight and offered for sale. The flight itself can impart collectability to the product. A transported product can be one of a limited edition of the product, with the end goal of selling the transported products to the general public at higher prices.

Figure 1:
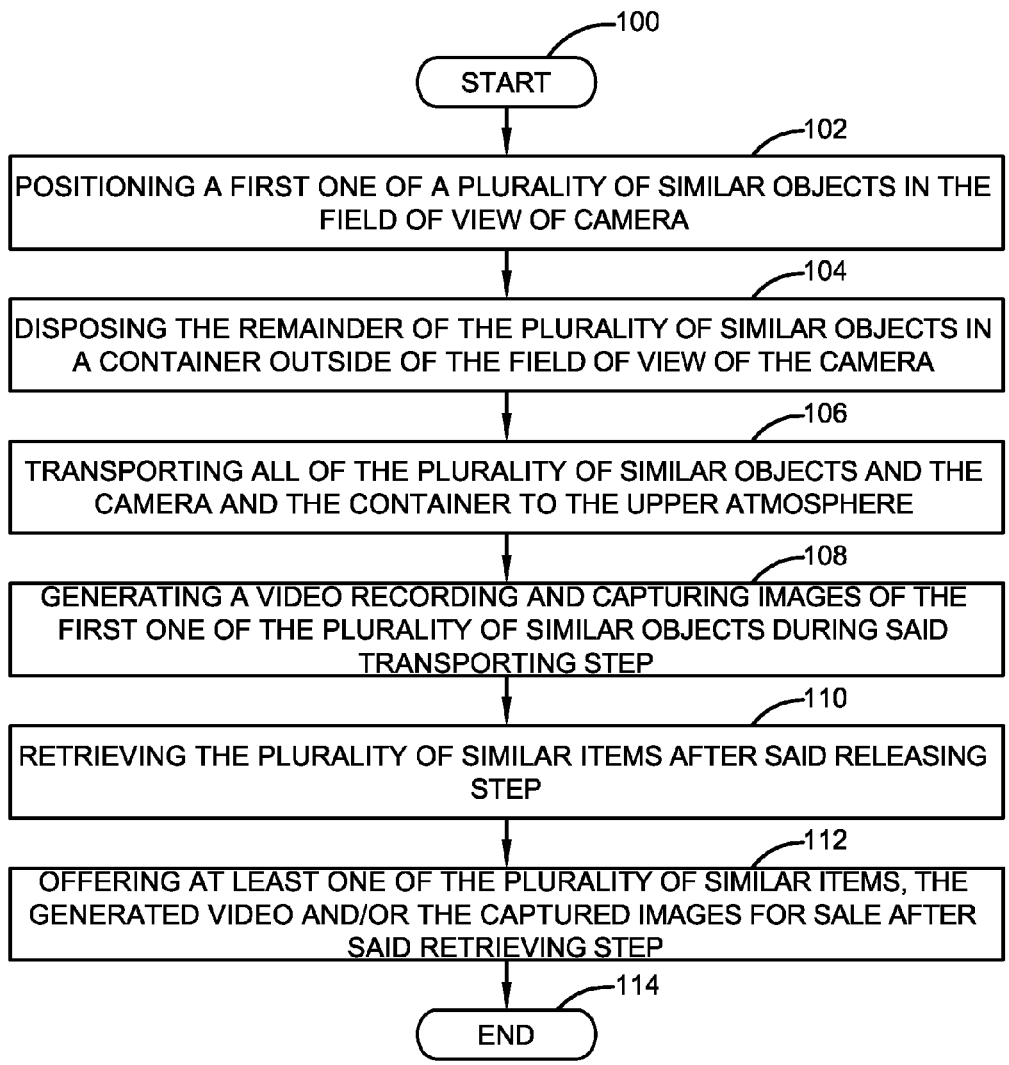
FIG. 1 is a simplified flow diagram of an exemplary embodiment of the invention.
Figure 2:
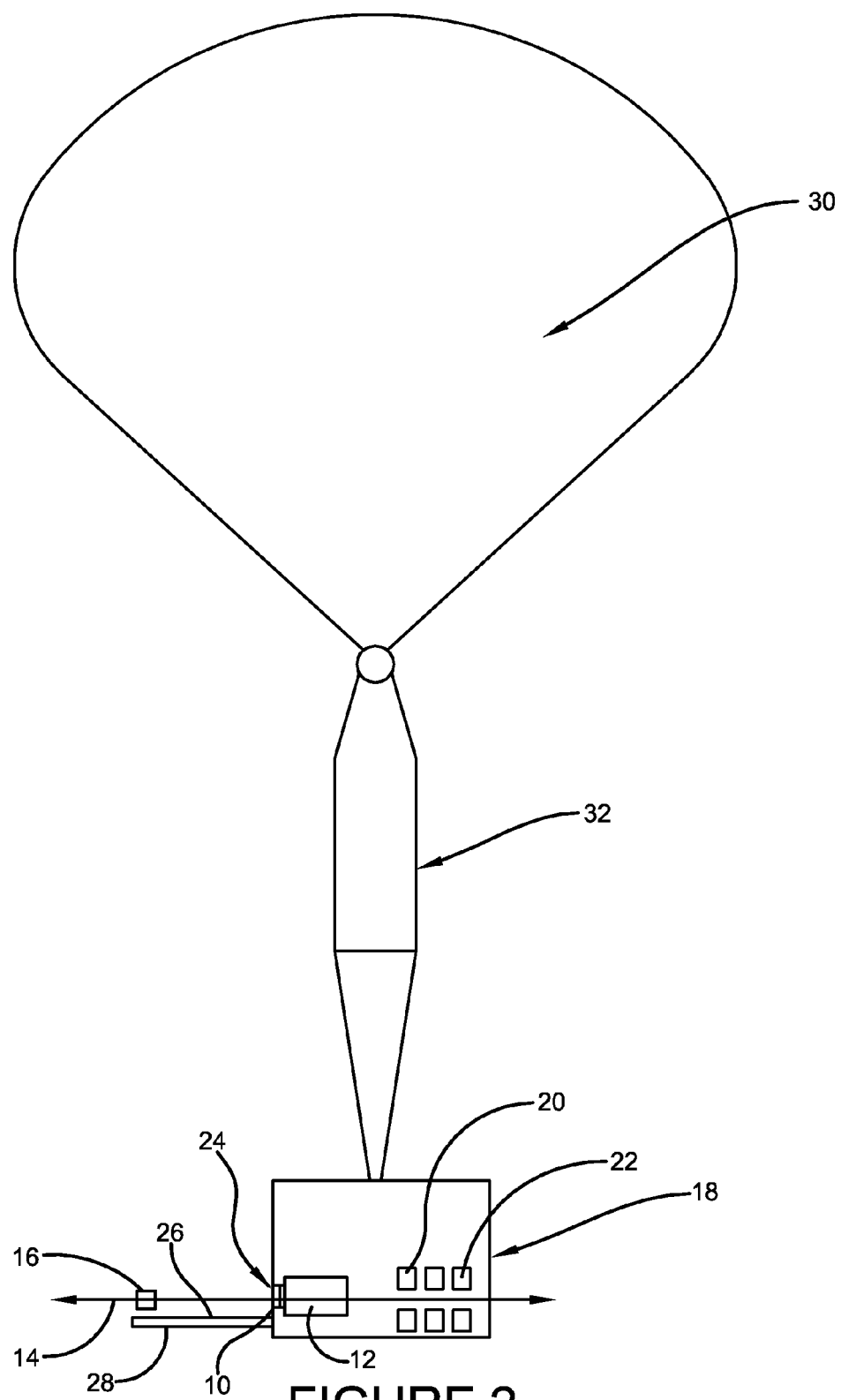
FIG. 2 is a schematic illustration of structures for carrying out an exemplary embodiment of the invention.

FIG. 1 is a simplified flow diagram of an exemplary embodiment of the invention, a method of transporting a plurality of similar objects starting at 100. The method includes the step 102 of positioning a first one of a plurality of similar objects in the field of view of a camera. FIG. 2 is a schematic illustration of structures for carrying out an exemplary embodiment of the invention. FIG. 2 shows a lens 10 of the camera 12 centered on an axis 14 and an object 16 disposed along the axis.

The object 16 is a first one of a plurality of similar objects applied in the exemplary embodiment. The object 16 and the remainder of plurality of similar objects can be products offered for sale. Examples of objects that can be applied in various embodiments of the invention include, but are not limited to, engagement rings, special gifts, key chains, jewelry, pens, vehicle emblems, cell phone cases, flash drives, apparel, edibles products such as candy, sporting equipment, toys, kitchen and home articles, and/or promotional products. In one or more embodiments, the plurality of objects can be identical. In one or more other embodiments, the plurality of objects can be similar by sharing a common feature, such as a logo or some other indicia.

Referring again to FIG. 1, the method also includes the step 104 of disposing the remainder of the plurality of similar objects in a container outside of the field of view of the camera 12. FIG. 2 shows a container 18 and a plurality of objects, such as objects 20 and 22, similar to object 16 disposed in the container 18.

The camera 12 can be mounted in the container 18 with the remainder of the plurality of similar objects 20, 22. The camera 12 can be positioned to align the lens 10 with an aperture 24 of the container 18. The axis 14 can project through the aperture 24. The alignment can be absolute; the central axis 14 of the lens 10 and the central axis of the aperture 24 can be collinear. Alternatively, the central axis 14 of the lens 10 and the central axis of the aperture 24 can be parallel and spaced from one another or the axes can be transverse to one another (spaced or intersecting).

As shown in FIG. 2, in one or more embodiments, a support arm 26 can be projected from the container 18. The object 16 can rest on the support arm. A distal end 28 of the support arm 26 can be disposed proximate to the axis. As a result, the distal end 28 is in a field of view of the camera 12. The distal end 28 can be proximate in that the axis 14 passes through the distal end 28 or in that the axis 14 passes close enough to the distal end 28 so that camera 12 can capture the distal end 28.

Referring again to FIG. 1, the method also includes the step 106 of transporting all of the plurality of similar objects and the camera 12 and the container 18 to the upper atmosphere. FIG. 2 shows the container 18 attached to a balloon 30. The balloon 30 can be filled with sufficient helium, hydrogen or any other carrier gas or combination of gases to elevate the container 18, the camera 12, and the plurality of similar objects 16, 20, 22. The balloon 30 can be released after the filling step, thus allowing the container 18, the camera 12, and the plurality of similar objects 16, 20, 22 to be transported to near space.

The exemplary structures also include a parachute 32. It is likely that the balloon 30 will burst at some height. When this occurs, the container 18 and contents will descend to Earth. The parachute 32 will allow the container 18 and contents to descend at a reduced speed, substantially or wholly preventing damage to the container 18, the camera 12, and the plurality of similar objects 16, 20, 22.

Figure 3:
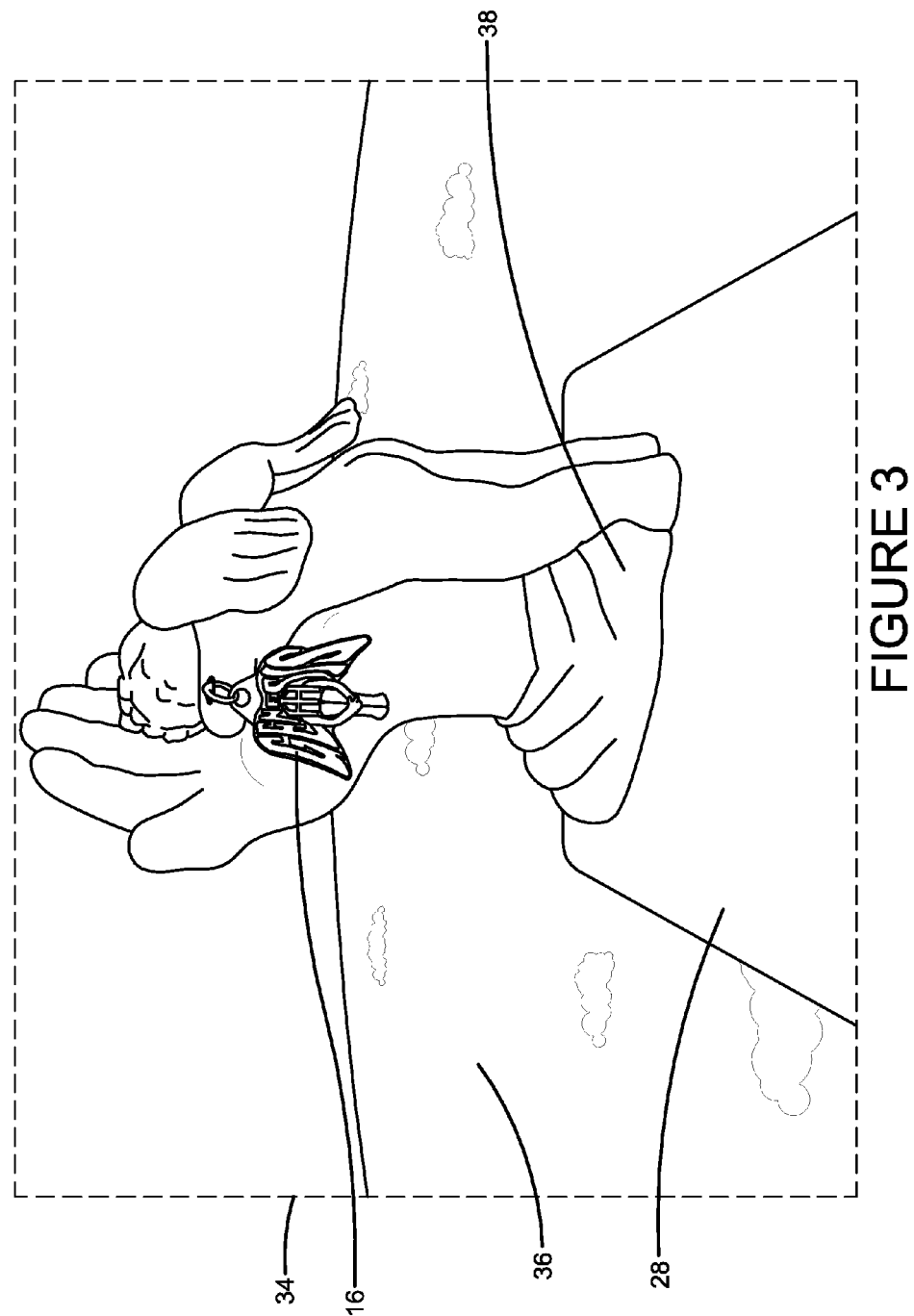
FIG. 3 is a screen shot of a first image captured during the execution of an exemplary embodiment of the invention.

Referring again to FIG. 1, the method also includes the step 108 of generating a video recording and capturing still images of the first one of the plurality of similar objects during at least a portion of the transporting step. FIG. 3 is a screen shot 34 of an image captured during the execution of an exemplary embodiment of the invention. The object 16 has been transported to near space and the Earth 36 is visible in the background.

Figure 4:
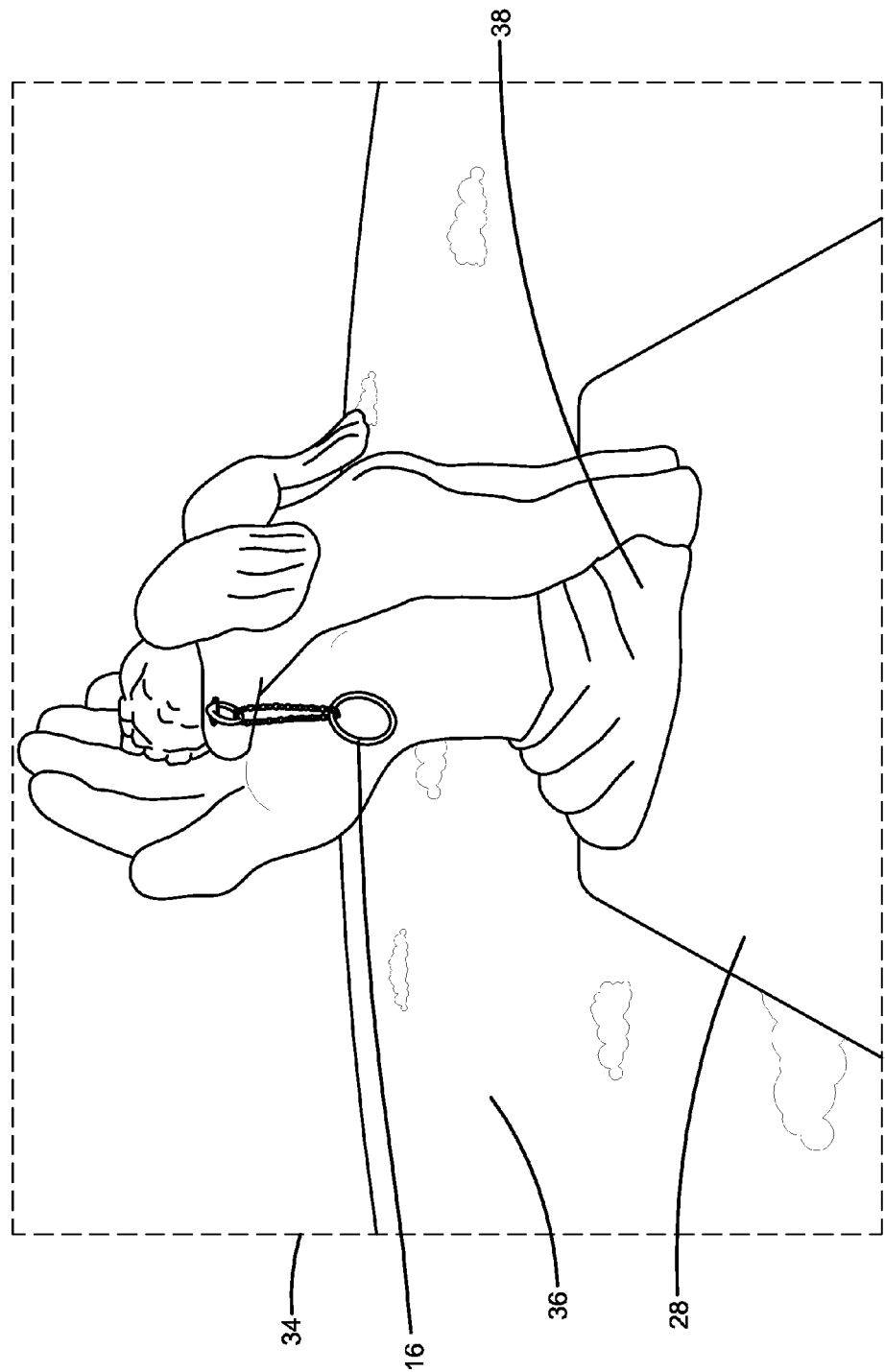
FIG. 4 is a screen shot of a fourth image captured during the execution of an exemplary embodiment of the invention.

FIG. 3 also shows another optional step that can be practiced in one or more embodiments of the broader invention. The object 16 can be releasibly positioned on a statuette 38 at the distal end 28. Any shape of statuette can be applied in embodiments of the broader invention. Still images can be captured during the flight and offered for sale. FIG. 3 shows a first embodiment in which the object 16 is a key chain. FIG. 4 shows a second embodiment in which the object 16 is a ring.

Figure 5:
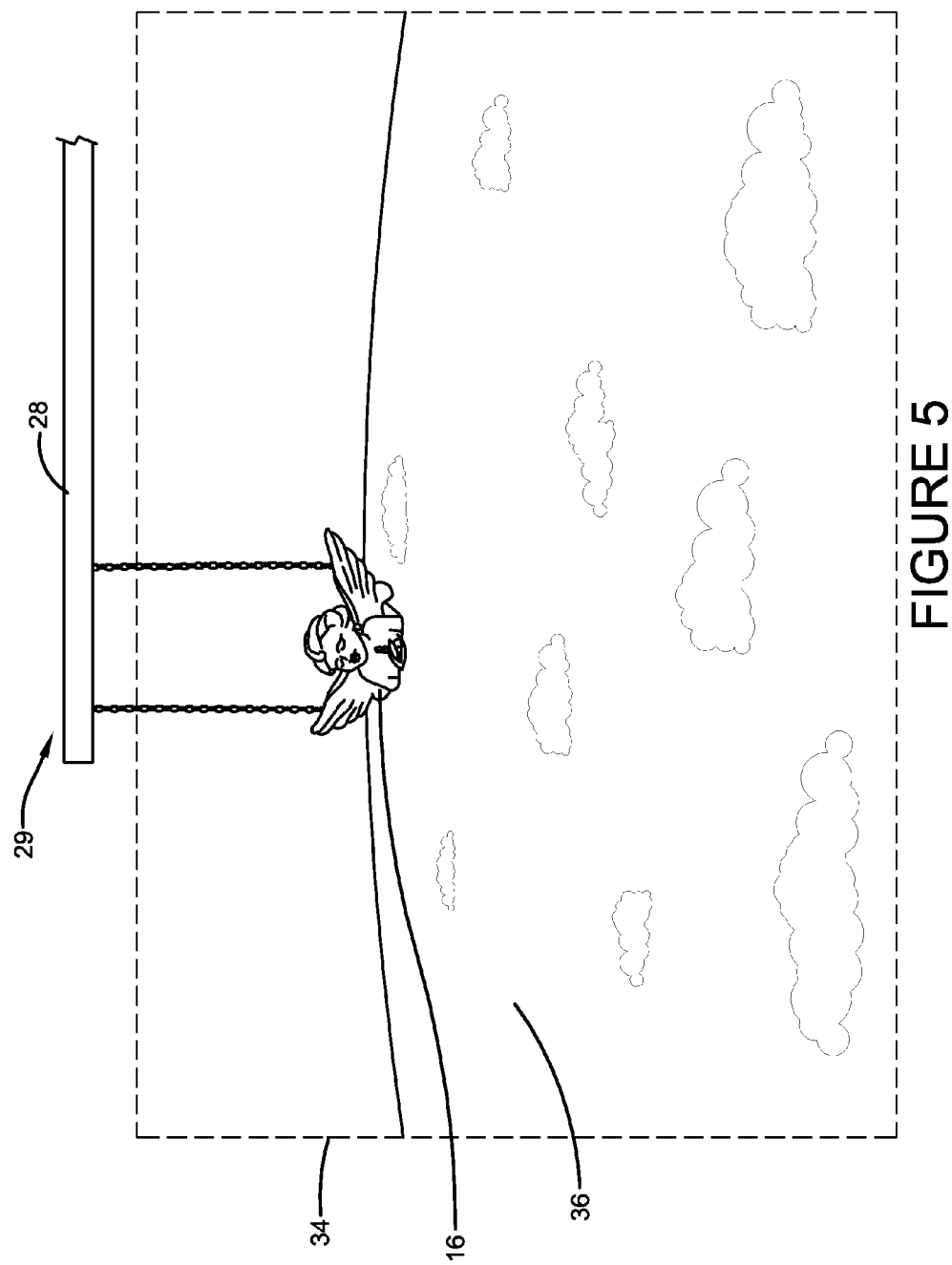
FIG. 5 is a screen shot of a third image captured during the execution of an exemplary embodiment of the invention.

FIG. 5 shows a third embodiment in which the object 16 is a pendant. Further, in the embodiment of FIG. 5, the distal end 28 is defined a bar 29 that extends laterally and outside the field of view. While not shown, the bar 29 is mounted to a container such as container 18. The pendent 16 is suspended from the bar 29 down into the field of view, which is bounded by the dashed line 34. Thus, the distal end 28 does not occupy the field of view and the captured image is more aesthetically pleasing, with space and the Earth occupying more of the frame.

Referring again to FIG. 1, an exemplary method of the broader invention can include the step 110 of retrieving the plurality of similar objects after the releasing step. In the exemplary embodiment, the container 18 can also house a radio transmitter emitting a tracking signal. After returning from near space to Earth, the container 18 can be located and the objects 16, 20, 22 can be retrieved. An exemplary method of the broader invention can include the step 112 of offering the plurality of similar objects, the generated video, and/or the captured images for sale after the retrieving step. The exemplary method ends at 114.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A method of transporting a plurality of similar objects comprising the steps of:
   connecting a first one of the plurality of similar objects in the field of view of a camera mounted on a container;
   arranging the camera such that the field of view is outside of the container;
   disposing the remainder of the plurality of similar objects in the container such that the remainder of the plurality of similar objects are outside of the field of view of the camera and such that the first one of the plurality of objects is not within the container;
   transporting all of the plurality of similar objects and the camera and the container to the upper atmosphere by attaching the container to a balloon and filling the balloon with sufficient helium, hydrogen or any other carrier gas or combination of gases to elevate the container and the camera and the plurality of similar objects and releasing the balloon after filling, said transporting said connecting whereby the first one of the plurality of similar objects remains in the field of view of the camera throughout said transporting; and
   generating a video recording and capturing still images of the first one of the plurality of similar objects during at least a portion of said transporting step.

2. The method of claim 1 further comprising the step of:
   mounting the camera within the container with the remainder of the plurality of similar objects.

3. The method of claim 1 further comprising:
   connecting the camera in the container; and
   aligning a lens of the camera with an axis projecting through an aperture of the container.

4. The method of claim 3 further comprising the steps of:
   projecting a support arm from the container; and
   disposing a distal end of the support arm proximate to the axis whereby the distal end is in a field of view of the camera.

5. The method of claim 4 further comprising the step of:
   releasibly connecting the first one of a plurality of similar objects at the distal end.

6. The method of claim 4 further comprising the step of:
   releasibly connecting the first one of a plurality of similar objects on a statuette at the distal end.

7. The method of claim 1 further comprising the step of:
   retrieving the plurality of similar objects after said releasing step.

8. The method of claim 1 further comprising the step of:
   retrieving the plurality of similar objects after said generating step by tracking a signal emitted by a radio transmitter.

9. The method of claim 8 further comprising the step of:
   offering the plurality of similar objects for sale after said retrieving step.

10. The method of claim 8 further comprising the step of:
    offering the video or any of the images for sale after the said retrieving step.

* * * * *